United States Patent
Takaki et al.

(10) Patent No.: US 11,300,805 B2
(45) Date of Patent: Apr. 12, 2022

(54) STEREOSCOPIC EYEGLASSES, METHOD FOR DESIGNING EYEGLASS LENS TO BE USED FOR THE STEREOSCOPIC EYEGLASSES, AND METHOD FOR OBSERVING STEREOSCOPIC IMAGE

(71) Applicants: National University Corporation Tokyo University of Agriculture and Technology, Fuchu (JP); Itoh Optical Industrial Co., Ltd., Gamagori (JP)

(72) Inventors: Yasuhiro Takaki, Fuchu (JP); Yasushi Miyajima, Gamagori (JP)

(73) Assignees: National University Corporation Tokyo University of Agriculture and Technology, Fuchu-shi (JP); Itoh Optical Industrial Co., Ltd., Gamagori-shi (JP)

( * ) Notice: Subject to any disclaimer, the term of this patent is extended or adjusted under 35 U.S.C. 154(b) by 0 days.

(21) Appl. No.: 16/976,159
(22) PCT Filed: Jun. 7, 2019
(86) PCT No.: PCT/JP2019/022759
§ 371 (c)(1),
(2) Date: Aug. 27, 2020
(87) PCT Pub. No.: WO2020/008804
PCT Pub. Date: Sep. 1, 2020

(65) Prior Publication Data
US 2021/0011304 A1     Jan. 14, 2021

(30) Foreign Application Priority Data

Jul. 3, 2018    (JP) .............................. JP2018-126993
Oct. 4, 2018    (JP) .............................. JP2018-189177

(51) Int. Cl.
*G02B 30/22*     (2020.01)
*G02B 5/30*     (2006.01)
(Continued)

(52) U.S. Cl.
CPC ...... *G02B 30/22* (2020.01); *G02B 2027/0134* (2013.01); *H04N 13/332* (2018.05)

(58) Field of Classification Search
None
See application file for complete search history.

(56) References Cited

U.S. PATENT DOCUMENTS

| | | | |
|---|---|---|---|
| 2014/0266990 A1 | 9/2014 | Makino et al. | |
| 2016/0026253 A1* | 1/2016 | Bradski | ............... H04N 13/344 345/8 |
| 2020/0319478 A1 | 10/2020 | Miyajima | |

FOREIGN PATENT DOCUMENTS

| | | |
|---|---|---|
| CN | 101014884 A | 8/2007 |
| DE | 20 2014 010406 U1 | 6/2015 |

(Continued)

OTHER PUBLICATIONS

Chihiro Masuda, "3D Display," Sangyo Tosho Publishing Co., Ltd., 1990, pp. 103-111 and the machine English translation of the relevant parts. (discussed in the spec).

(Continued)

*Primary Examiner* — Patricia I Young
(74) *Attorney, Agent, or Firm* — Locke Lord LLP

(57) ABSTRACT

Provided are stereoscopic eyeglasses capable of reducing visual fatigue in binocular stereoscopic display by a simple configuration. In stereoscopic eyeglasses, in order to expand a tolerance of match between vergence and accommodation enabling comfortable stereovision in eyeglasses-using stereoscopic display, wide-focus lenses ranging in focal length are incorporated so as to overlap optical filters in light transmission directions, and accordingly, visual fatigue to be caused by vergence-accommodation conflict during stereoscopic image observation is reduced.

9 Claims, 16 Drawing Sheets

(51) Int. Cl.
G02C 7/02 (2006.01)
G02C 7/06 (2006.01)
G02C 7/10 (2006.01)
G02C 7/12 (2006.01)
H04N 13/332 (2018.01)
G02B 27/01 (2006.01)

(56) References Cited

FOREIGN PATENT DOCUMENTS

| EP | 3467573 A1 | 4/2019 |
|---|---|---|
| JP | H09-297282 A | 11/1997 |
| JP | 2004-279743 A | 10/2004 |
| JP | 2004-294817 A | 10/2004 |
| JP | 2004-294848 A | 10/2004 |
| JP | 2009-282391 A | 12/2009 |
| JP | 2012-42613 A | 3/2012 |
| JP | 2012-78670 A | 4/2012 |
| JP | 2016-206338 A | 12/2016 |
| JP | 2018-84788 A | 5/2018 |
| WO | 2006/018834 A1 | 2/2006 |
| WO | 2012/120470 A1 | 9/2012 |
| WO | 2018/096647 A1 | 5/2018 |

OTHER PUBLICATIONS

Editor, Hiroshi Harashima et al., "3D Image and Human Science," Ohmsha, Ltd., 2000, pp. 249-251 and the machine English translation of the relevant parts. (discussed in the spec).
X. Hu et al., "High-resolution optical see-through muti-focal-plane head-mounted display using freeform optics," Optics Express vol. 22, May 30, 2014, pp. 13896-13903. (discussed in the spec).
N. Padmanaban et al., "Optimizing Virtual Reality for All Users through Gaze-Contingent and Adaptive Focus Displays," PNAS vol. 114, No. 9, Feb. 28, 2017, pp. 2183-2188. (discussed in the spec).
T. Shibata et al., "The zone of comfort: Predicting visual discomfort with stereo displays," J.Vision, vol. 11(8): 11, 2011, pp. 1-53 (discussed in the spec).
G. Mikula et al., "Imaging with extended focal depth by means of lenses with radial and angular modulation," Optics Express, vol. 15, No. 15, Jul. 11, 2007, pp. 9184-9193. (discussed in the spec).
J. Sochacki et al., "Nonparaxial design of generalized axicons," Applied Optics, vol. 31, No. 25, Sep. 1, 1992, pp. 5326-5330, (discussed in the spec).
N. Davidson et al., "Holographic axilens: high resolution and long focal depth," Optics Letters, vol. 16, No. 7, Apr. 1, 1991, pp. 523-525. (discussed in the spec).
International Search Report dated Jul. 30, 2019, issued for PCT/JP2019/022759.
"Latest Stereo Imaging Technology", Minlu Dai, Southeast University Press, Nov. 2013, pp. 47-50 (cited in the Feb. 26, 2021 Search Report issued for CN201980005854X).
Search Report dated Feb. 26, 2021, issed for Chinese patent application No. 201980005854X.
Supplementary European Search Report dated Sep. 21, 2021, issued for European Patent Application No. 19831454.4.
T. Shibata et al. "The zone of comfort: Predicting visual discomfort with stereo displays," Journal of Vision, vol. 11, No. 8, 2011, pp. 1-53. (cited in the Sep. 24, 2021 Office Action issued for CN201980005854.X).
Office Action dated Sep. 24, 2021, issued for Chinese Patent Application No. 201980005854.X and English translation thereof.

* cited by examiner

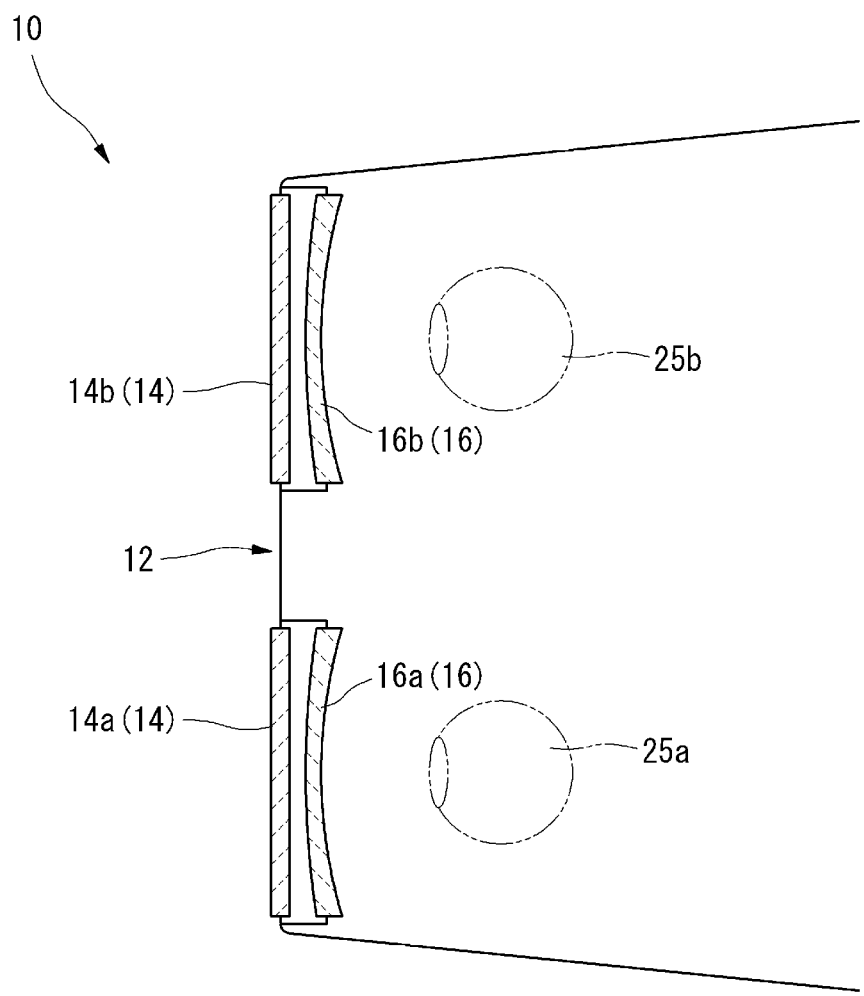

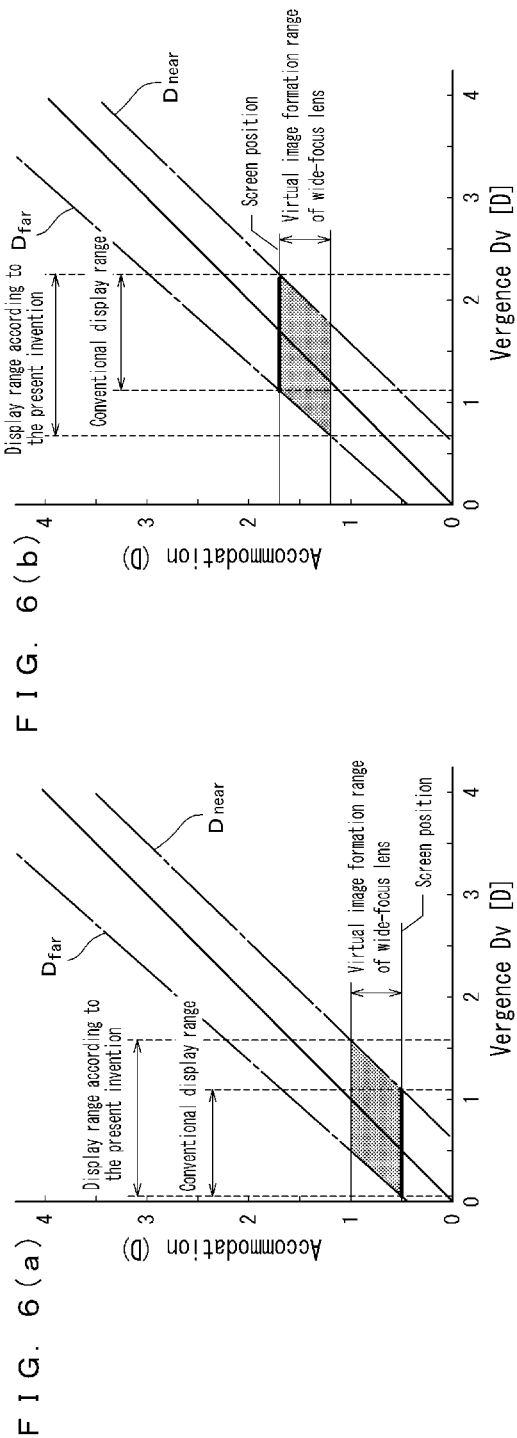
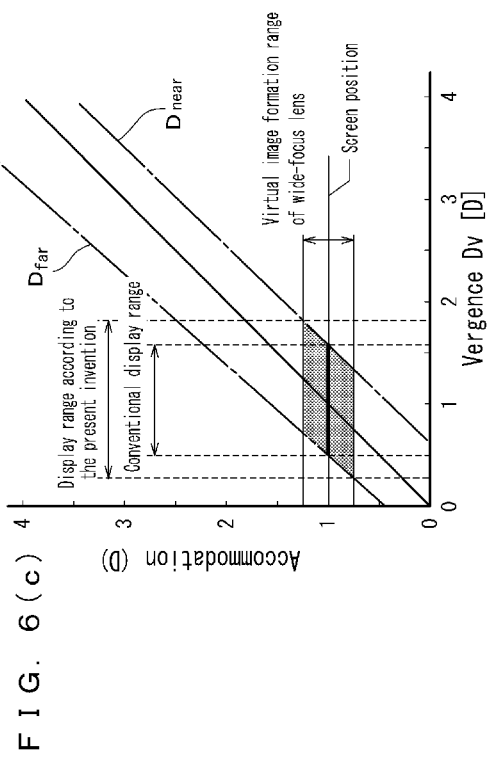
FIG. 6(a)  FIG. 6(b)  FIG. 6(c)

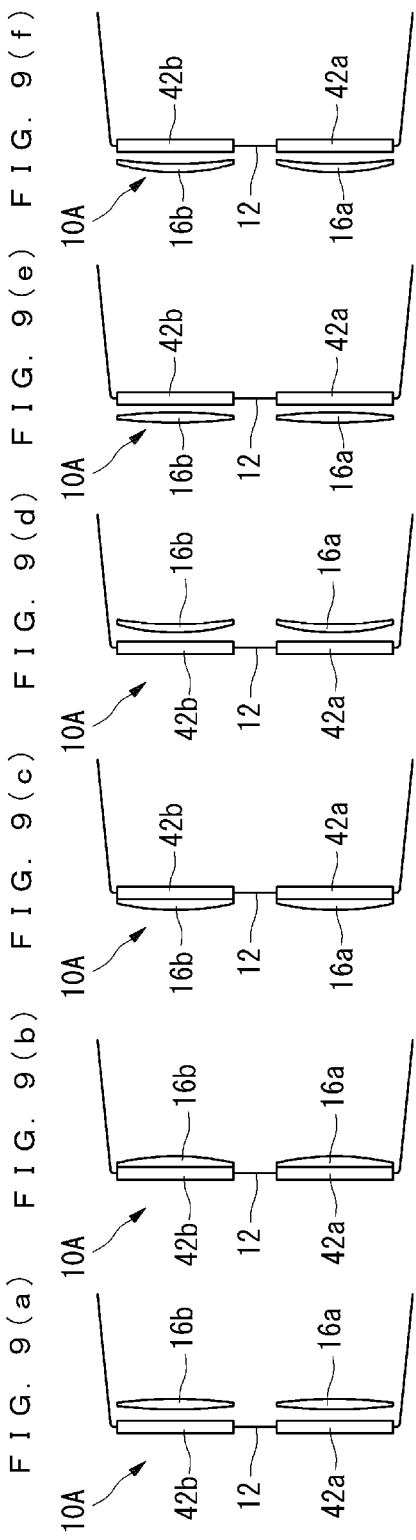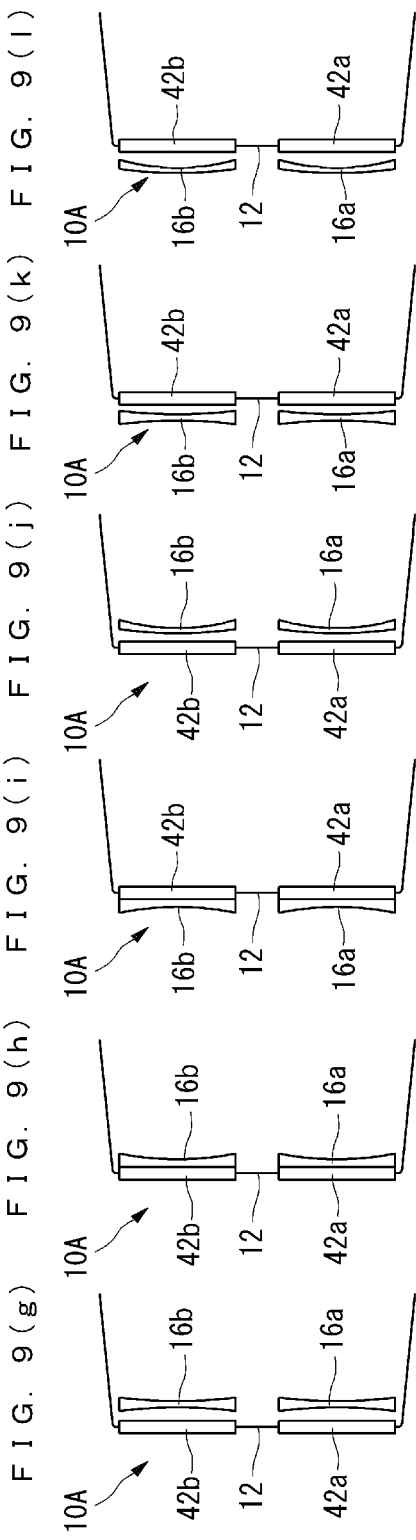

FIG. 15
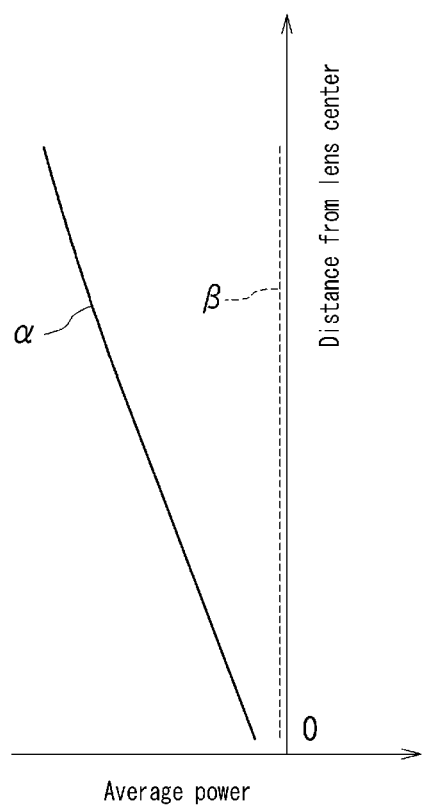
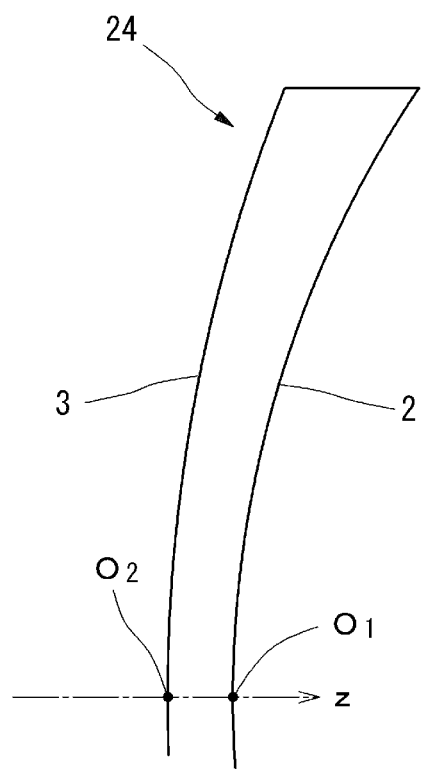
FIG. 16(a)
How is viewability?
FIG. 16(b)
How is eye fatigue?
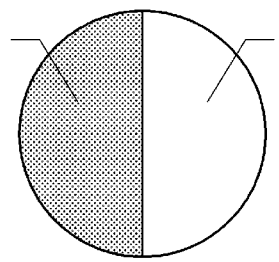
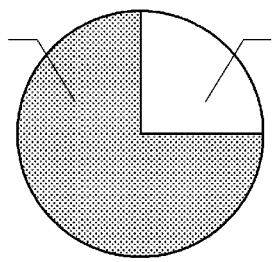

How is viewability?

How is eye fatigue?

STEREOSCOPIC EYEGLASSES, METHOD FOR DESIGNING EYEGLASS LENS TO BE USED FOR THE STEREOSCOPIC EYEGLASSES, AND METHOD FOR OBSERVING STEREOSCOPIC IMAGE

TECHNICAL FIELD

The present invention relates to stereoscopic eyeglasses to be used for binocular stereoscopic display, a method for designing an eyeglass lens to be used for the stereoscopic eyeglasses, and a method for observing a stereoscopic image using the stereoscopic eyeglasses.

BACKGROUND ART 3D movies, stereoscopic televisions, and stereoscopic endoscopes, etc., which enable stereoscopic display of images have been put into practical use. Many of these are binocular stereoscopic displays using stereoscopic eyeglasses (refer to, for example, Non-Patent Literatures 1 and 2 listed below).

FIG. 18 is an explanatory view illustrating a principle of binocular stereoscopic display. In this figure, 100 denotes an image display device, and 110 denotes stereoscopic eyeglasses. The image display device 100 displays an image for the left eye and an image for the right eye which have parallax as viewed from the positions of the left eye and the right eye.

On the other hand, to the stereoscopic eyeglasses 110, an optical filter 14a for the left eye and an optical filter 14b for the right eye are attached. These optical filters 14a and 14b have functions to selectively transmit an image for the left eye and an image for the right eye, and for example, polarizers, liquid crystal shutters, and spectral filters, etc., are used.

With the left eye 25a of an observer wearing the stereoscopic eyeglasses 110, only the image for the left eye displayed on the image display device 100 is visually recognized, and with the right eye 25b of the observer, only the image for the right eye displayed on the image display device 100 is visually recognized. Accordingly, the observer can observe a stereoscopic image.

A problem with this binocular stereoscopic display is visual fatigue caused by vergence-accommodation conflict. When the human eye gazes at the point of an object, the human left and right eyeballs rotate so that the point of gaze comes to the center of the retina, and vergence is a function to perceive a depth of the point of gaze on the principle of triangulation based on eyeball rotation angle information. Accommodation is a function to perceive a depth based on eye focusing information when human eyes automatically focus on an observing object.

In binocular stereoscopic display, an image for the left eye and an image for the right eye which have parallax corresponding to the left and right eyes are displayed. At this time, the left and right eyeballs of an observer rotate to capture a stereoscopic image, and by vergence, the observer correctly perceives a depth of the stereoscopic image. On the other hand, the eyes come into focus on a display surface displaying the image for the left eye and the image for the right eye, so that accommodation does not correctly function, and the depth of the stereoscopic image cannot be correctly perceived by accommodation. The human stereo-vision function has interaction between vergence and accommodation, and includes vergence accommodation to guide focusing of the eyes to a depth position perceived by vergence. However, in the case of a stereoscopic image displayed by binocular stereoscopic display, when an attempt is made to bring the eyes into focus by vergence accommodation on a position perceived by vergence, a retinal image is blurred. In this way, it is said that visual fatigue is caused by conflict between vergence and accommodation. This visual fatigue has become a significant factor which hinders the spread of binocular stereoscopic display using stereoscopic eyeglasses.

Means to eliminate visual fatigue caused by vergence-accommodation conflict are described in Non-Patent Literature 3 and Non-Patent Literature 4 listed below. Non-Patent Literature 3 discloses that an image forming system including a variable-focal-length mirror and a display is provided for each of the left eye and the right eye, and by using the variable-focal-length mirrors, an image of a display surface is formed at a plurality of different depth positions, and accordingly, focusing of the eyes on a stereoscopic image is enabled. In this case, a DMD (Digital Micromirror Device) capable of performing high-speed display is used as a display, and a stereoscopic image is displayed in a time-division manner.

Non-Patent Literature 4 listed below discloses that, in a head-mounted display capable of dynamically changing an image forming system including a display by using a variable-focal-length lens and a motor, rotation angles of the left and right eyes are detected and a depth perceiving position by vergence is calculated, and the image forming relationship of the image forming system is changed so as to form an image of a display surface at the calculated depth position, and accordingly, depth perceiving positions by vergence and accommodation are matched with each other.

However, in these technologies described in Non-Patent Literatures 3 and 4, the image forming system must be disposed in front of the eye, and this is realized by a head-mounted stereoscopic display. Therefore, these technologies cannot be applied to a television type or monitor type stereoscopic display that is used in a stereoscopic television or stereoscopic endoscope and installed at a position away from the eyes.

The technology in which a plurality of images are displayed, described in Non-Patent Literature 3, has a problem of an increase in cost because variable-focal-length mirrors and displays capable of performing high-speed display are needed. Further, the display capable of performing high-speed display has a problem in which the number of gradations is generally small. Further, an image processing device is needed which generates, at a high speed, images divided in a depth direction to be displayed on the display capable of performing high-speed display.

On the other hand, the technology using a variable image forming system, described in Non-Patent Literature 4, needs a means to detect eyeball rotation angles. In addition, it has problems of an increase in cost and an increase in weight of the head-mounted display due to use of a mechanical mechanism including a variable-focal-length lens and a motor.

Citation List

Patent Literature

Patent Literature 1: JP No. 2016-206338 A

Non-Patent Literatures

Non-Patent Literature 1: Chihiro Masuda, "3D Display" (1990), Sangyo Tosho Publishing Co., Ltd.

Non-Patent Literature 2: Supervisory editor by Hiroshi Harashima, jointly edited by Norio Motoki and Sumio Yano, "3D Image and Human Science" (2000), Ohmsha, Ltd.

Non-Patent Literature 3: X. Hu and H. Hua, "High-resolution optical see-through multi-focal-plane head-mounted display using freeform optics," Opt. Express vol. 22, p. 13896-13903 (2014).

Non-Patent Literature 4: N. Padmanaban, R. Konrad, T. Stramer, E. A. Cooper, and G. Wetzstein, "Optimizing virtual reality for all users through gaze-contingent and adaptive focus displays," PNAS vol. 114, p. 2183-2188 (2017).

Non-Patent Literature 5: T. Shibata, J. kim, D. M. Hoffman, M. S. Banks, "The zone of comfort: Predicting visual discomfort with stereo displays," J. Vision, vol. 11, 11 (2011).

Non-Patent Literature 6: G. Mikula, Z. Jaroszewicz, A. Kolodziejczyk, K. Petelczyc, and M Sypek, "Images with extended focal depth by means of lenses with radial and angular modulation," Opt. Express, vol. 15, p. 9184-9193 (2007).

Non-Patent Literature 7: J. Sochacki, A Ko?odziejczyk, Z. Jaroszewicz, and S. Bara, "Nonparaxial design of generalized axicons," Appl. Opt., vol. 31, p. 5326-5330 (1992).

Non-Patent Literature 8: N, Davidson, A. A. Friesem, and E. Hasman, "Holographic axilens: high resolution and long focal depth," Opt. Lett., vol. 16, p. 523-525 (1991).

SUMMARY OF INVENTION

Technical Problem

The present invention solves the above-described problem, and an object of the present invention is to provide stereoscopic eyeglasses capable of reducing visual fatigue in binocular stereoscopic display by a simple configuration, a method for designing a lens to be used for the stereoscopic eyeglasses, and a method for observing a stereoscopic image by using the stereoscopic eyeglasses.

Solution to Problem

Stereoscopic eyeglasses according to the present invention are characterized in that wide-focus lenses that range in focal length are incorporated to expand a tolerance of match between vergence and accommodation enabling comfortable stereovision in eyeglasses-using stereovision.

A normal lens has one focal length, however, a wide-focus lens ranges in focal length from one certain value to another certain value. In other words, when light parallel to an optical axis enters a normal lens, the light is condensed to one point on the optical axis, however, when light parallel to an optical axis enters a wide-focus lens, the light is condensed to a range with a width from one certain point to another certain point on the optical axis.

Generally, a lens having one focal length is called a unifocal lens, and a lens having a plurality of focal lengths is called a multifocal lens. Here, a lens ranging in focal length is referred to as a wide-focus lens.

In stereovision, when a vergence position and an accommodation position match each other, visual fatigue to be caused by vergence-accommodation conflict does not occur. However, in order to realize comfortable stereovision without visual fatigue, a vergence position and an accommodation position do not have to completely match each other, and it is known that there is a tolerance of match to some extent between a vergence position and an accommodation position.

FIG. 1 is a diagram illustrating a relationship between vergence and accommodation. In this figure, the horizontal axis represents vergence, and the vertical axis represents accommodation. Values are in units of diopter (D) which is a reciprocal of a focal length measured in meters. For example, Non-Patent Literature 5 listed above shows that, even when vergence and accommodation do not match each other, if vergence and accommodation have a relationship in which they are between $D_{far}$ and $D_{near}$ illustrated in FIG. 1, comfortable stereovision without visual fatigue is enabled. Specifically, there is a tolerance of match between vergence and accommodation realizing comfortable stereovision.

In the same figure, when a position on which the eyes come into focus is taken on the vertical axis, a range of vergence enabling comfortable stereovision can be obtained on the horizontal axis. Specifically, a reciprocal $1/I_0$ of a distance $I_0$ to a display surface 100a in FIG. 18 is given on the vertical axis of FIG. 1, and corresponding values of $D_{far}$ and $D_{near}$ are read from the horizontal axis, and accordingly, a range of vergence enabling comfortable stereovision can be known. Here, in a case where $I_{far}=1/D_{far}$ and $I_{near}=1/D_{near}$, in FIG. 18, visual fatigue does not occur when a stereoscopic image 30 is displayed in the range from the distance $I_{near}$ to $I_{far}$.

In the present invention, as a means to easily expand a stereoscopic image display range enabling comfortable stereovision, a wide-focus lens is added to stereoscopic eyeglasses.

In FIG. 2, 10 denotes stereoscopic eyeglasses to be used in binocular stereoscopic display, and an optical filter 14a for the left eye and an optical filter 14b for the right eye are attached to a frame 12. At the front (sides opposite to the eyeballs) or the rear (eyeball sides) of the optical filter 14a for the left eye and the optical filter for the right eye 14b, a wide-focus lens 16a for the left eye and a wide-focus lens 16b for the right eye are attached at positions overlapping these optical filters 14a and 14b. In the following description, the optical filter 14a for the left eye and the optical filter 14b for the right eye may simply be referred to as an "optical filter 14." The wide-focus lens 16a for the left eye and the wide-focus lens 16b for the right eye may simply be referred to as a "wide-focus lens 16."

These optical filters 14a and 14b respectively have functions to selectively transmit an image for the left eye and an image for the right eye.

The stereoscopic eyeglasses 10 are configured so that, with respect to an image for the left eye and an image for the right eye displayed on a display surface 100a of an image display device 100 (refer to FIG. 18), light related to the image for the right eye is blocked by the optical filter 14a for the left eye, and only light related to the image for the left eye is transmitted through the optical filter 14a for the left eye. In addition, the stereoscopic eyeglasses are configured so that light related to the image for the left eye is blocked by the optical filter 14b for the right eye, and only light related to the image for the right eye is transmitted through the optical filter 14b for the right eye. Therefore, the image for the left eye is viewed with the left eye 25a of the observer, and the image for the right eye is viewed with the right eye 25b of the observer.

The wide-focus lenses 16a and 16b are lenses that range in focal length. As such wide-focus lenses, for example, Axicon described in Non-Patent Literature 6, axilens described in Non-Patent Literature 7, the light sword optical element described in Non-Patent Literature 8, and a third-order aspherical lens described in Patent Literature 1, etc., can be used.

The wide-focus lens 16 ranges in focal length, so that as illustrated in FIG. 3(a), even when an object 35 as a target is fixed at the position of the distance $I_0$, a real image 36 of the object is formed in a range having a certain width (range from $I_1$ to $I_2$). In a case where this wide-focus lens 16 is combined with the stereoscopic eyeglasses, virtual image formation in which an image becomes an upright image is used, and in this case as well, as illustrated in FIGS. 3(b) and 3(c), the virtual image 38 is also formed in the range with a certain width (range from $I_1$ to $I_2$). FIG. 3(b) illustrates a case where a wide-focus lens with a positive focal length is used, and FIG. 3(c) illustrates a case where a wide-focus lens with a negative focal length is used.

Next, with reference to FIGS. 4 and 5, operation and an effect of stereoscopic eyeglasses according to the present invention which include wide-focus lenses, are described. Hereinafter, a focal length of the wide-focus lens 16 is $f_1$ to $f_2$. A distance between the wide-focus lens 16 and the eye 25 is sufficiently short as compared with a distance between the display surface 100a and the wide-focus lens 16, so that the wide-focus lens 16 is regarded as being in contact with the eye 25, and a distance between the display surface 100a and the eye 25 is defined as $I_0$, and a distance between a position at which a virtual image 38 of the display surface 100a is formed and the eye 25 is defined as $I_1$ to $I_2$.

First, when conventional stereoscopic eyeglasses 110 are used, as illustrated in FIG. 4(a), the eye 25 of the observer comes into focus on the display surface 100a. On the other hand, when a positive wide-focus lens 16 is added, as illustrated in FIG. 4(b), a virtual image 38 of the display surface 100a is formed in a range from distance $I_1$ to $I_2$ from the eye at a side opposite to the observer with respect to the display surface 100a. In other words, the observer's eye 25 can be focused on this range from $I_1$ to $I_2$. When a negative wide-focus lens 16 is added, as illustrated in FIG. 4(c), a virtual image 38 of the display surface 100a is formed in a range from distance $I_1$ to $I_2$ from the eye at the observer side of the display surface 100a. In other words, the observer's eye 25 can be focused on this range from $I_1$ to $I_2$.

However, in the cases using the wide-focus lenses 16 illustrated in FIGS. 4(b) and 4(c), an image 40 obtained on the retina is an image obtained by overlapping virtual images formed at different positions, so that the resolution of the image is generally lower than an image obtained by using a normal unifocal lens.

Here, according to an image formation formula, the following is obtained.

[Numerical Expression 1]

$$\frac{1}{I_0} - \frac{1}{I_1} = \frac{1}{f_1} \qquad \text{Equation (1)}$$

$$\frac{1}{I_0} - \frac{1}{I_2} = \frac{1}{f_2} \qquad \text{Equation (2)}$$

Accordingly, the range from $I_1$ to $I_2$ in which a virtual image is formed is obtained as:

[Numerical Expression 2]

$$\frac{1}{I_1} = \frac{1}{I_0} - \frac{1}{f_1} \qquad \text{Equation (3)}$$

$$\frac{1}{I_2} = \frac{1}{I_0} - \frac{1}{f_2} \qquad \text{Equation (4)}$$

The eye is focused on this virtual image, so that the focus of the eye can vary in the range from $I_1$ to $I_2$. Therefore, as illustrated in FIG. 5, accommodation has a range from $1/I_1$ to $1/I_2$ on the vertical axis of the graph, so that a corresponding range of vergence is expanded. Therefore, a stereoscopic image display range enabling comfortable stereovision is expanded.

Here, according to Non-Patent Literature 5 listed above, a stereoscopic image display range enabling comfortable stereovision can be expressed by using a far end $D_{far}$ and a near end $D_{near}$ corresponding to a depth $D_v$ perceived by vergence. By using $D_v$, $D_{far}$ and $D_{near}$ are given as:

$$D_{far} = 1.129 D_v + 0.442 \qquad \text{Equation (5)}$$

$$D_{near} = 1.035 D_v - 0.626 \qquad \text{Equation (6)}$$

A range of the focal length of the wide-focus lens 16 to be used for the stereoscopic eyeglasses 10 can be properly set according to an observation distance (distance from the eye to the display surface).

First, a case where the observation distance is long is described. This corresponds to, for example, a case of a stereoscopic television, and the observation distance is approximately 2 m (0.5 D). This is described with reference to FIG. 6(a). In a case where the eye is focused on this observation distance, when $D_v$ is obtained by setting $D_{far}=0.5$ D and $D_{near}=0.5$ D in Equations (5) and (6), a range of vergence enabling comfortable stereovision is obtained as 0.92 m (1.1 D) to 19 m (0.051 D). In other words, an uncomfortable region is present at the front of the stereoscopic television. In this case, by using a wide-focus lens 16 with a negative focal length, a comfortable region can be expanded at the front of the stereoscopic television.

For example, when a wide-focus lens with a focal length of −2.0 m (−0.5 D) to −∞(0 D) is used, a range in which the eye can be focused is obtained as 0.50 D to 1.0 D according to Equations (3) and (4). When $D_v$ is obtained by setting $D_{far}=0.50$ D and $D_{near}=1.0$ D in Equations (5) and (6), a range of vergence enabling comfortable stereovision is expanded to 0.64 m (1.6 D) to 19 m (0.051 D). That is, this shows that the comfortable region is expanded at the front of the stereoscopic television.

Next, a case where the observation distance is short will be described. This corresponds to, for example, a case of a stereoscopic monitor to be used for stereoscopic endoscopic surgery, and the observation distance is approximately 0.6 m (1.7 D). This is described with reference to FIG. 6(b). In a case where the eye is focused on this observation distance, when $D_v$ is obtained by setting $D_{far}=1.7$ D and $D_{near}=1.7$ D in Equations (5) and (6), a range of vergence enabling comfortable stereovision is 0.45 m (2.2 D) to 0.92 m (1.1 D), and an uncomfortable region is present at the rear of the stereoscopic monitor. In this case, by using a positive wide-focus lens 16, a comfortable region can be expanded at the rear of the stereoscopic monitor.

For example, when a wide-focus lens with a focal length of 2.0 m (0.5 D) to (0 D) is used, a range in which the eye can be focused is obtained as 1.2 D to 1.7 D according to Equations (3) and (4). When $D_v$ is obtained by setting $D_{far}=1.2$ D and $D_{near}=1.7$ D in Equations (5) and (6), a range of vergence enabling comfortable stereovision is expanded to 0.45 m (2.2 D) to 1.6 m (0.64 D). This shows that a comfortable region is expanded at the rear of the stereoscopic monitor.

Next, a case where the observation distance is medium will be described. This corresponds to, for example, a case of a stereoscopic monitor for a PC, and the observation distance is approximately 1.0 m (1.0 D). This is described with reference to FIG. 6(c). In a case where the eye is focused on this observation distance, when $D_v$ is obtained by setting $D_{far}=1.0$ D and $D_{near}=1.0$ D in Equations (5) and (6), a range of vergence enabling comfortable stereovision is 0.64 m (1.6 D) to 2.0 m (0.49 D), and an uncomfortable region is present at both of the front and the rear of the stereoscopic monitor. In this case, by using a wide-focus lens 16 with positive and negative focal lengths, a comfortable region can be expanded at the front and the rear of the stereoscopic monitor.

For example, when a wide-focus lens with focal lengths of 4.0 m (0.25 D) to $+\infty$(0 D) and $-\infty$(0 D) to $-4.0$ m ($-0.25$ D) is used, a range in which the eye can be focused is obtained as 0.75 D to 1.3 D according to Equations (3) and (4). When $D_v$ is obtained by setting $D_{far}=0.75$ D and $D_{near}=1.3$ D in Equations (5) and (6), a range of vergence enabling comfortable stereovision is expanded to 0.55 m (1.8 D) to 3.7 m (0.2 D). This shows that comfortable regions are expanded at the front and the rear of the stereoscopic monitor.

In binocular stereoscopic display, as a method for separating left and right images, there are three type of methods, a polarization method, a liquid crystal shutter method, and a spectral filter method described later. The stereoscopic eyeglasses 10 of the present invention can be configured by using optical filters adapted to each method. In detail, in the case of the polarization method, the optical filters can be formed of polarizers. In the case of the liquid crystal shutter method, the optical filters can be formed of liquid crystal shutters. In the case of the spectral filter method, the optical filters can be formed of spectral filters.

In endoscopic surgery, a stereoscopic endoscope that enables stereoscopic observation of the inside of the abdominal cavity has been used. However, in endoscopic surgery that takes a long time, the burden on the surgeon due to visual fatigue becomes a problem. According to the present invention, the burden on the surgeon at the time of surgery using a stereoscopic endoscope can be reduced.

In movies and game machines, stereoscopic display functions have been realized. However, the functions cannot be widely spread due to visual fatigue. In these fields, spread of 3D movies and 3D games can be expected by using the stereoscopic eyeglasses of the present invention.

The present invention is realized by a simple configuration in which conventional stereoscopic eyeglasses are combined with wide-focus lenses, and has the following advantages. (1) Wide-focus lenses can be made of plastic, so that the configuration can be realized at low cost. (2) Conventional stereoscopic televisions, stereoscopic monitors, and projectors of 3D movies can be used as they are, so that compatibility with conventional technologies is high, and the cost related to the display device does not increase. (3) Conventional binocular stereoscopic video content can be used as is.

In the stereoscopic eyeglasses of the present invention, the wide-focus lens and the optical filter can be configured in various forms. For example, the wide-focus lens and the optical filter can be configured separately from each other. In this case, by forming both lens surfaces opposed to each other of the wide-focus lens of curved surfaces, a wide angle of view as viewed from the eye and uniform characteristics can be obtained. On the other hand, the wide-focus lens and the optical filter can be joined integrally. Accordingly, stereoscopic eyeglasses of the present invention can be realized with a compact configuration.

In the stereoscopic eyeglasses of the present invention, an eyeglass lens in which, when an axis in the anteroposterior direction passing through a lens optical center is defined as a z-axis, and a direction toward the rear side of the lens is defined as a positive direction of the z-axis, an average power stabilization component which is expressed as $Ar^4+Br^6+Cr^8+Dr^{10}$ (r is a distance from the z-axis, and A, B, C, and D are constants) and suppresses variations in average power from the lens optical center to a lens peripheral edge portion is added to a z-coordinate value of at least one of the front surface and the rear surface of the lens, and a depth-of-field extension component expressed as $Er^3$ (E is a constant) is added to a z-coordinate value of either the front surface or the rear surface of the lens, can be used as a wide-focus lens.

The eyeglass lens to which a depth-of-field extension component is thus added can be gradually changed in average power to the negative side or the positive side from the lens optical center toward the lens peripheral edge portion. In other words, the focal length can be continuously changed from the lens optical center toward the lens peripheral edge portion.

In the eyeglass lens, a power component for correcting at least myopia, hyperopia, and astigmatism can be further set. Accordingly, the eyeglasses can be used not only for stereovision but also as eyeglasses to be usually worn.

A method for designing an eyeglass lens to be used for the stereoscopic eyeglasses of the present invention includes a first aspherical component adding step of adding an average power stabilization component which is expressed as, when an axis in the anteroposterior direction passing through a lens optical center is defined as a z-axis, and a direction toward the rear side of the lens is defined as a positive direction of the z-axis, $Ar^4+Br^6+Cr^8+Dr^{10}$ (r is a distance from the z-axis, and A, B, C, and D are constants) and suppresses variations in average power from the lens optical center to a lens peripheral edge portion, to a z-coordinate value of at least one of the front surface and the rear surface of the lens determined according to the prescription power, and a second aspherical component adding step of adding a depth-of-field extension component which is expressed as $Er^3$ (E is a constant) and extends a depth of field, to a z-coordinate value of either the front surface or the rear surface of the lens.

According to the designing method of the present invention, a gradient of power changes can be substantially constantly maintained in a wide range from the lens center to the lens peripheral edge portion, so that an effect of expanding the range enabling comfortable stereovision can be stably secured not only at the lens center but also at the lens peripheral edge portion.

Effect of Invention

According to the present invention described above, with a simple configuration, stereoscopic eyeglasses capable of reducing visual fatigue in binocular stereoscopic display, a method for designing a lens to be used for the stereoscopic eyeglasses, and a method for observing a stereoscopic image by using the stereoscopic eyeglasses, can be provided.

BRIEF DESCRIPTION OF DRAWINGS

FIG. 2 is a view illustrating a configuration of stereoscopic eyeglasses of the present invention.

FIG. 3 are views for describing states of image formation in wide-focus lenses.

FIG. 6(a) is a diagram for describing an effect of the stereoscopic eyeglasses illustrated in FIG. 2 when an observation distance is long, FIG. 6(b) is a diagram for describing an effect of the stereoscopic eyeglasses illustrated in FIG. 2 when the observation distance is short, and FIG. 6(c) is a diagram for describing an effect of the stereoscopic eyeglasses illustrated in FIG. 2 when the observation distance is medium.

FIGS. 9(a) to 9(1) are views respectively illustrating configurations of stereoscopic eyeglasses using polarizers.

FIG. 15 is a diagram illustrating average power changes along a lens radial direction in the eyeglass lens illustrated in FIGS. 13.

FIG. 16 are diagrams illustrating evaluation results of the stereoscopic eyeglasses of the same embodiment, and FIG. 16(a) illustrates "viewability" and FIG. 16(b) illustrates "eye fatigue."

DESCRIPTION OF EMBODIMENTS

First Embodiment

An embodiment of stereoscopic eyeglasses and a method for observing a stereoscopic image, adapted to stereoscopic display using a polarization method, will be described.

Figure 1:
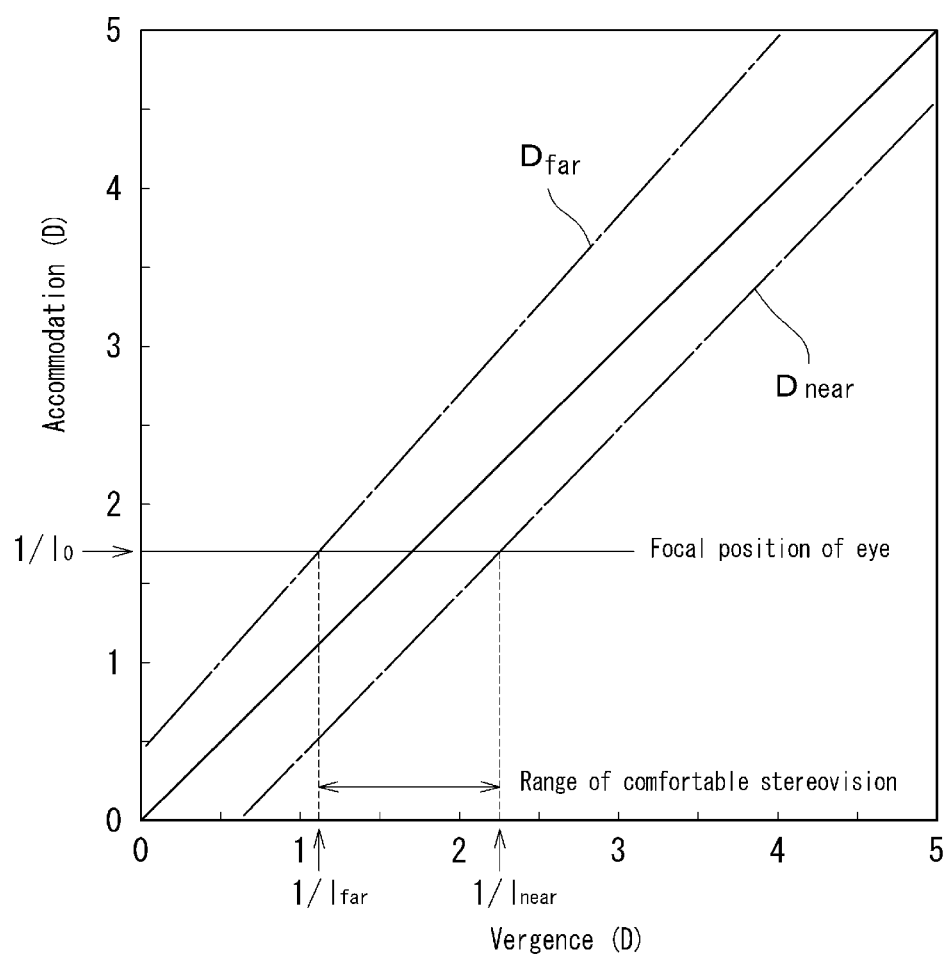
FIG. 1 is a diagram for describing a relationship between accommodation and vergence.
Figure 3A:
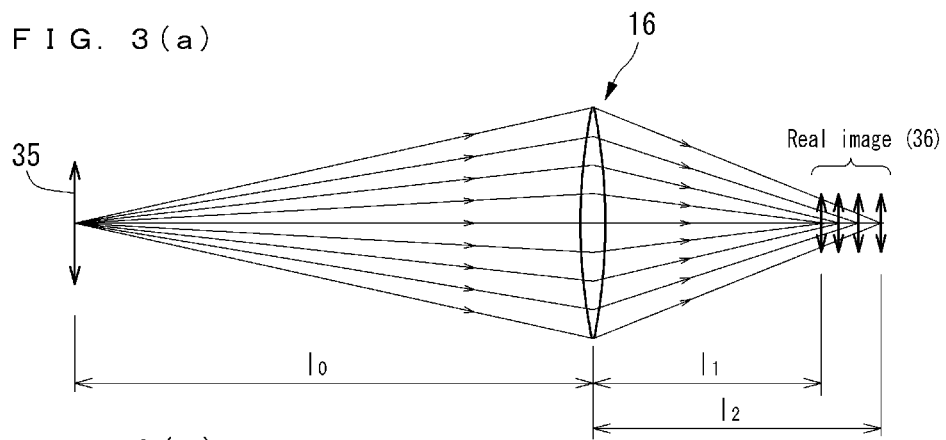
FIG. 3(a) illustrates a case of real image formation.
Figure 3B:
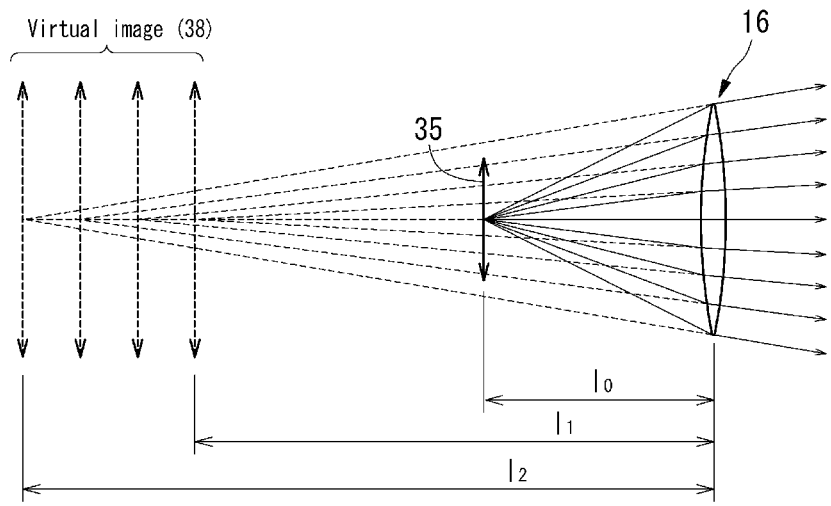
FIGS. 3(b) and 3(c) illustrate cases of virtual image formation.
Figure 3C:
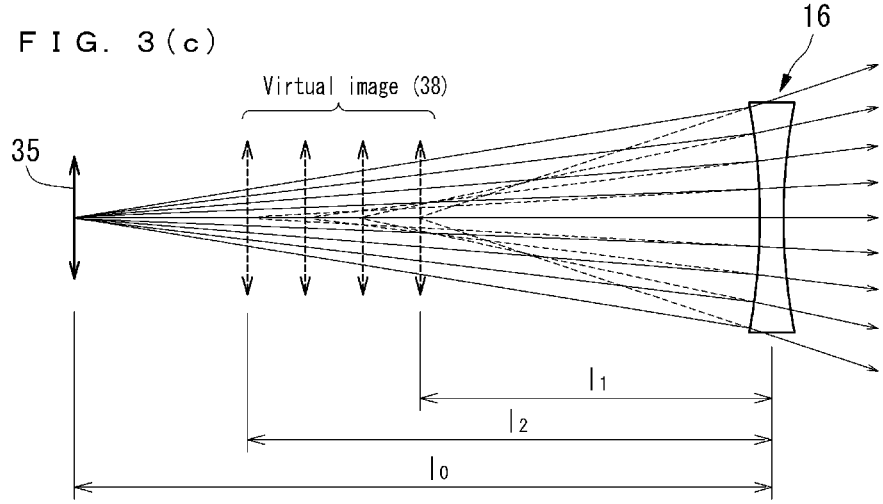
Figure 4A:
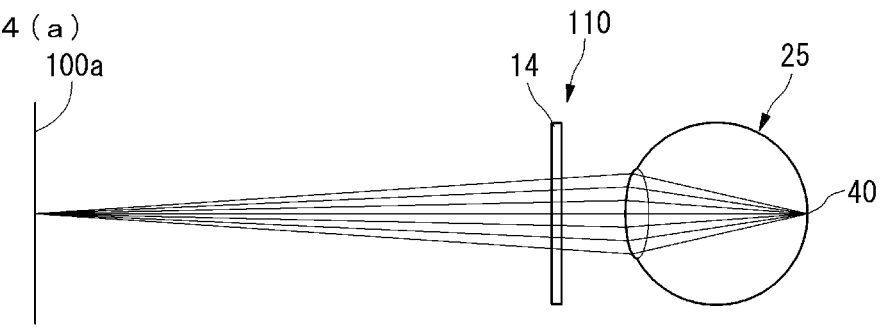
FIG. 4(a) is an operation explanatory view of conventional stereoscopic eyeglasses.
Figure 4B:
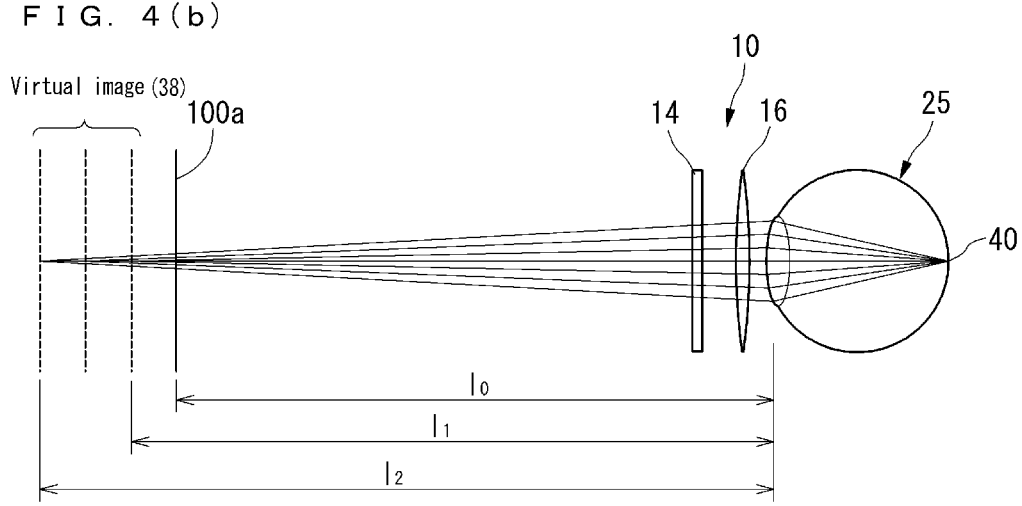
FIGS. 4(b) and 4(c) are operation explanatory views of the stereoscopic eyeglasses illustrated in FIG. 2.
Figure 4C:
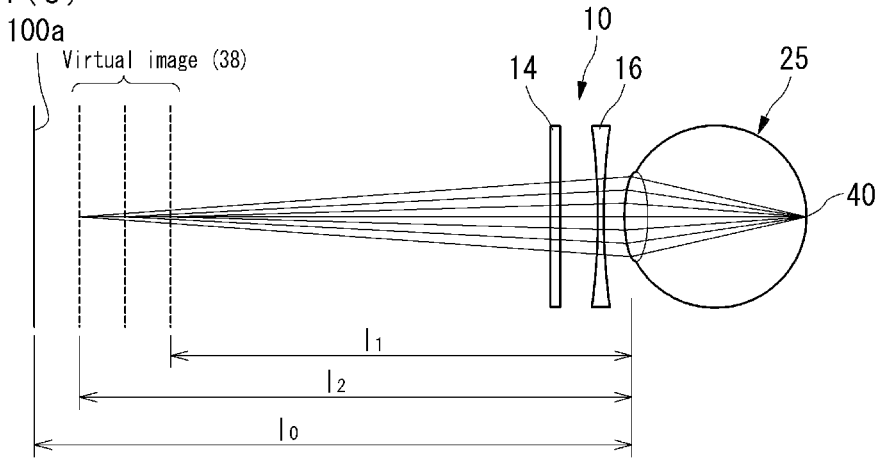
Figure 5:
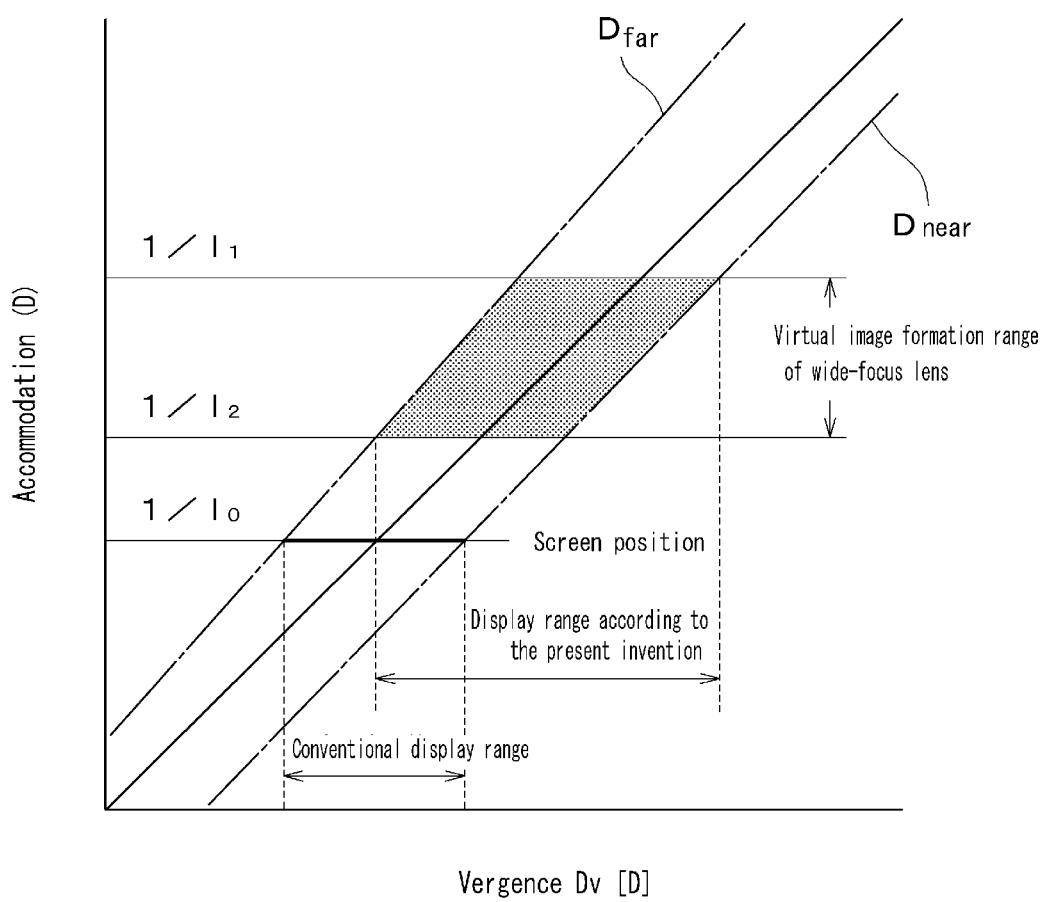
FIG. 5 is an operation explanatory view following FIGS. 4.
Figure 7:
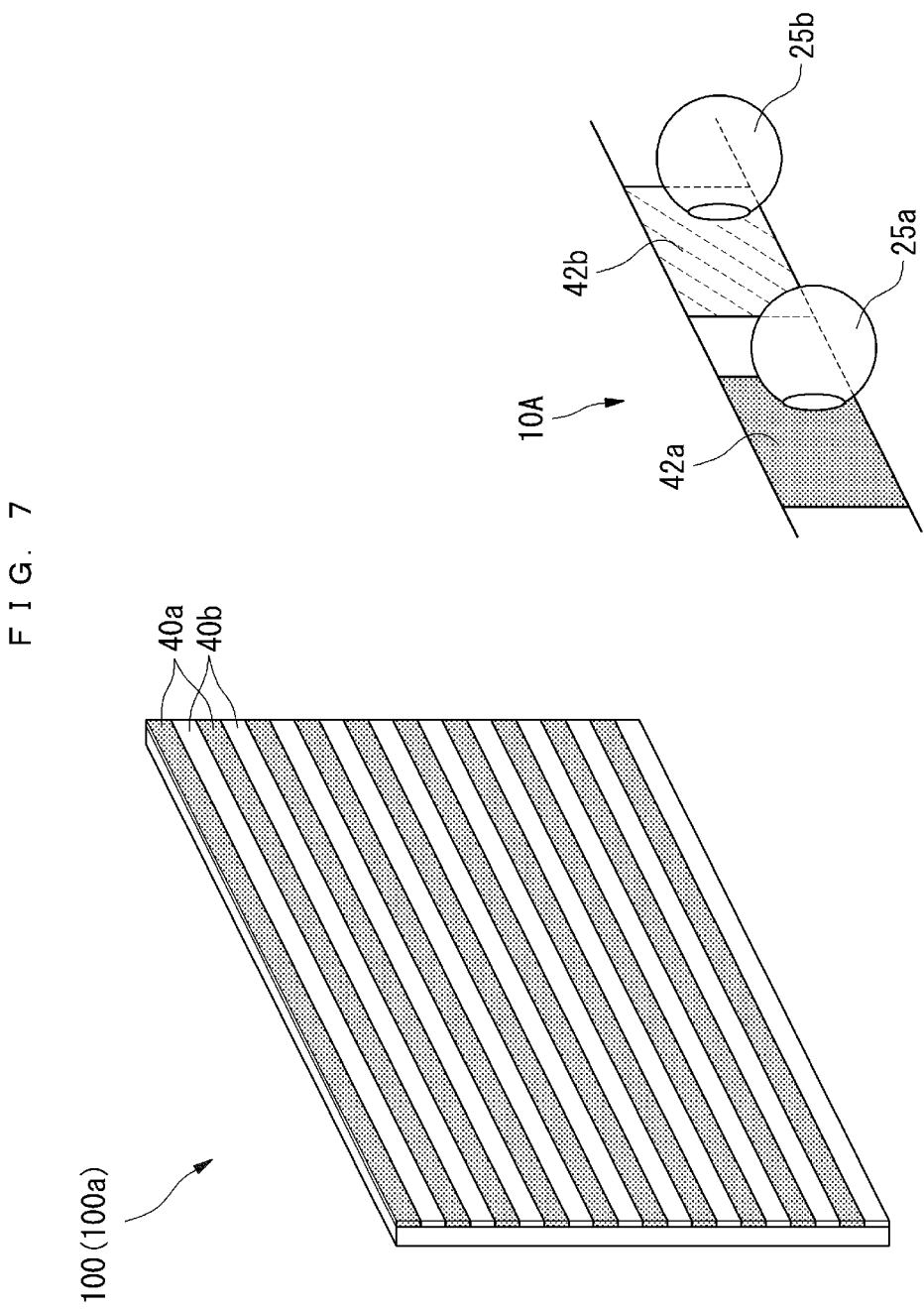
FIG. 7 is a view illustrating stereoscopic eyeglasses according to an embodiment of the present invention together with a stereoscopic display device adapted to a polarization method.

When an image display device 100 is a television type or a monitor type, as illustrated in FIG. 7, to a display surface 100a, horizontally long wave plates 40a and 40b corresponding to odd-numbered and even-numbered scanning lines are attached and configured so that, to display images of odd-numbered and even-numbered scanning lines, circularly polarized lights whose rotation directions are opposite to each other are given. By using odd-numbered and even-numbered scanning lines, an image for the left eye and an image for the right eye are displayed. The correspondence relationship between the odd-numbered and even-numbered scanning lines and an image for the left eye and an image for the right eye to be displayed may be reversed.

To stereoscopic eyeglasses 10A adapted to this display, a polarizer 42a for the left eye and a polarizer 42b for the right eye are attached as optical filters. The polarizer 42a for the left eye and the polarizer 42b for the right eye transmit only circularly polarized lights whose rotation directions are opposite to each other, and are configured so that the image for the left eye is viewed with the left eye 25a of an observer, and the image for the right eye is viewed with the right eye 25b of the observer. In this example, as the polarizers, polarization films are used.

Here, the case using circularly polarized lights whose rotation directions are opposite to each other is described by way of example, however, linearly polarized lights orthogonal to each other can also be used instead. In this case, normal polarizers that transmit linearly polarized lights can be used.

Figure 8:
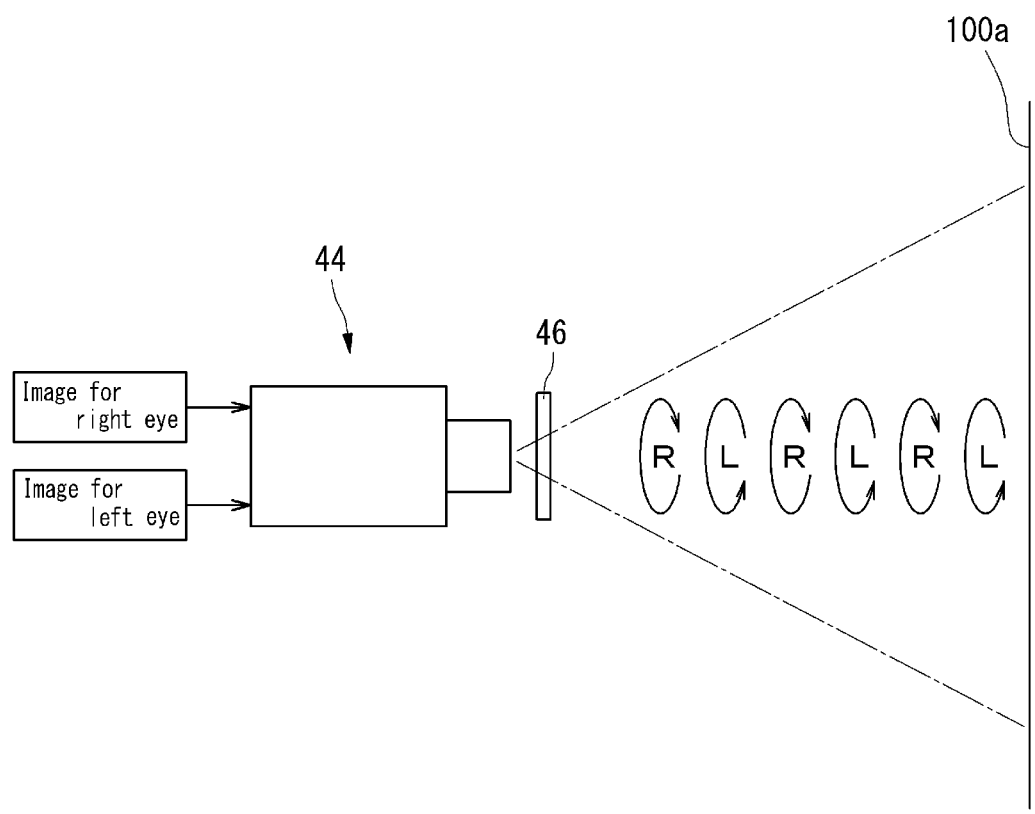
FIG. 8 is a view illustrating a projector adapted to a polarization method.

In the case of a 3D movie, as illustrated in FIG. 8, images for the left eye and the right eye are alternately displayed by double-speed driving a projector 44, and a liquid crystal element 46 to control light polarization states is disposed in front of the projector 44 so that circularly polarized lights whose rotation directions are opposite to each other (or linearly polarized lights orthogonal to each other) are given to the image for the left eye and the image for the right eye.

FIG. 9 illustrate a configuration of stereoscopic eyeglasses 10A adapted to a polarization method. In the stereoscopic eyeglasses 10A, a wide-focus lens 16a for the left eye and a wide-focus lens 16b for the right eye are disposed corresponding to the polarizer 42a for the left eye and the polarizer 42b for the right eye. FIGS. 9(a) to 9(f) illustrate cases using positive wide-focus lenses, and FIGS. 9(g) to 9(i) illustrate cases using negative wide-focus lenses.

The stereoscopic eyeglasses 10A can also be configured so that the polarizer 42 (42a, 42b) and the wide-focus lens 16 (16a, 16b) are separated from each other as illustrated in FIGS. 9(a), 9(d), 9(e), 9(f), 9(g), 9(j), 9(k), and 9(l). When the polarizer 42 and the wide-focus lens 16 are separated from each other, either one of the polarizer 42 and the wide-focus lens 16 can be detached from the frame 12 as necessary. As illustrated in FIGS. 9(d), 9(f), 9(j), and 9(l), by using a wide-focus lens 16 whose both lens surfaces opposed to each other are curved surfaces, a wide angle of view as viewed from the eye and uniform characteristics can be obtained.

It is also possible that the wide-focus lens 16 is integrally joined to the polarizer 42 as illustrated in FIGS. 9(b), 9(c), 9(h), and 9(i). This enables the stereoscopic eyeglasses 10A to be configured in a compact manner.

It is also possible that the wide-focus lens 16 is disposed at the front (side opposite to the eyeball) with respect to the polarizer 42 as illustrated in FIGS. 9(e), 9(f), 9(k), and 9(l).

As described later, in the present example, as the wide-focus lens 16, an eyeglass lens to which a depth-of-field extension component is added is used.

Second Embodiment

An embodiment of stereoscopic eyeglasses and a method for observing a stereoscopic image, adapted to stereoscopic display using a liquid crystal shutter method, will be described.

Figure 10:
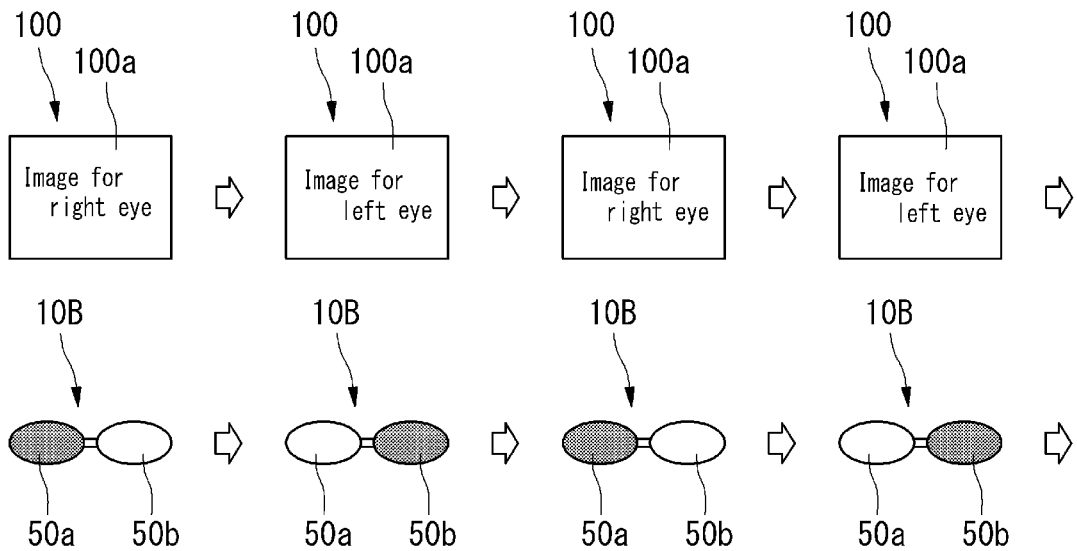
FIG. 10 is a view illustrating stereoscopic eyeglasses according to another embodiment of the present invention together with a stereoscopic display device adapted to a liquid crystal shutter method.
Figure 11:
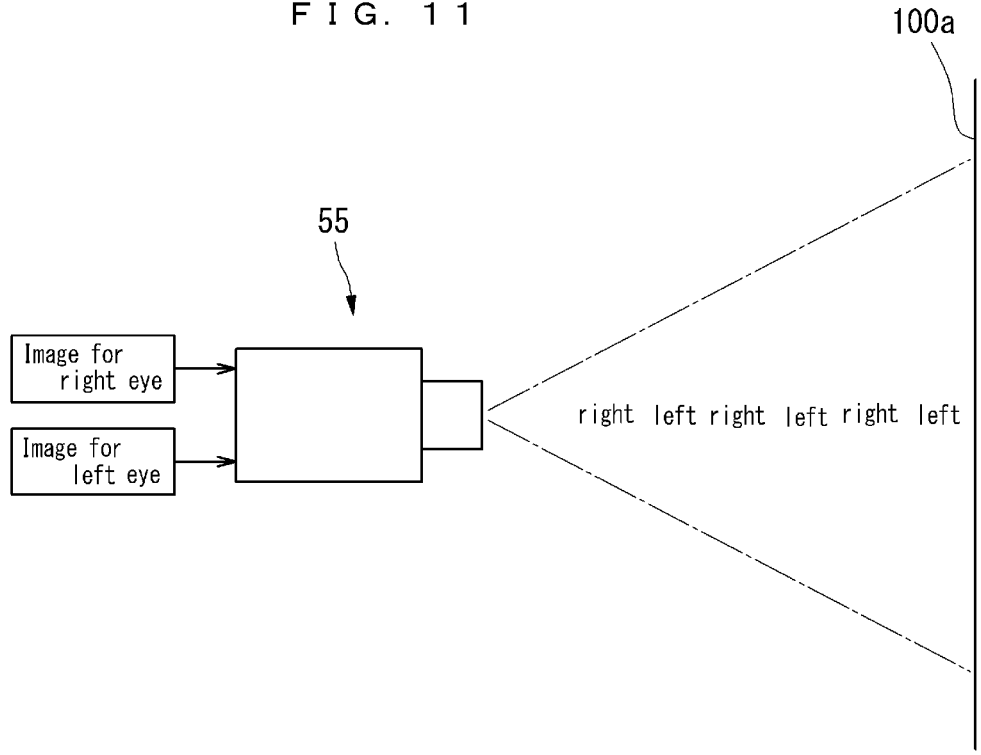
FIG. 11 is a view illustrating a projector adapted to a liquid crystal shutter method.

In stereoscopic display using a liquid crystal shutter method, in a case where an image display device 100 is a television type or a monitor type, an image for the left eye and an image for the right eye are alternately displayed by double-speed driving as illustrated in FIG. 10. In a case of a 3D movie, an image for the left eye and an image for the right eye are alternately displayed by double-speed driving a projector 55 as illustrated in FIG. 11.

To stereoscopic eyeglasses 10B adapted to this display, a liquid crystal shutter 50a for the left eye and a liquid crystal shutter 50b for the right eye are attached as optical filters. These liquid crystal shutters 50a and 50b are configured to be switchable between a transmissive state and a non-transmissive state according to image displays for the left eye and the right eye displayed on the display surface 100a. Accordingly, the stereoscopic eyeglasses are configured so that the image for the left eye is viewed with the left eye of an observer, and the image for the right eye is viewed with the right eye of an observer.

In the stereoscopic eyeglasses 10B as well, a wide-focus lens 16a for the left eye and a wide-focus lens 16b for the right eye are disposed corresponding to the liquid crystal shutter 50a for the left eye and the liquid crystal shutter 50b for the right eye. The stereoscopic eyeglasses 10B can also be configured by combining the liquid crystal shutters 50a and 50b and the wide-focus lenses 16a and 16b as appropriate as in the case of the stereoscopic eyeglasses 10A illustrated in FIGS. 9.

Third Embodiment

An embodiment of stereoscopic eyeglasses and a method for observing a stereoscopic image, adapted to stereoscopic display using a spectral filter method, will be described.

Figure 12A:
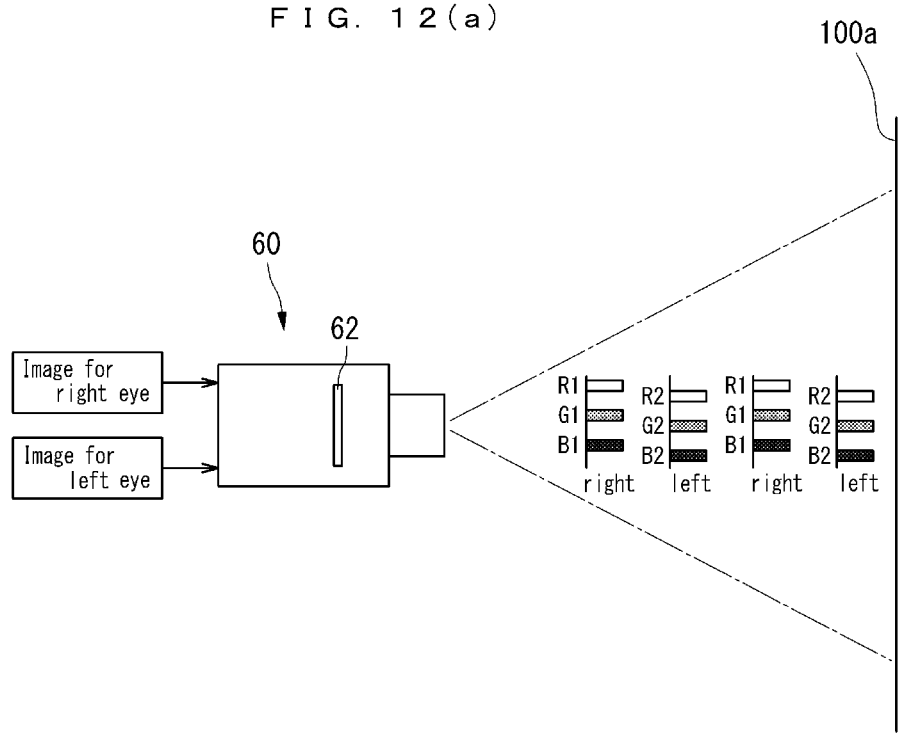
FIG. 12(a) is a view illustrating a projector adapted to a spectral filter method.

Stereoscopic display using spectral filters as optical filters is used in a case of a 3D movie. As illustrated in FIG. 12(a), in a projector 60, a color filter 62 capable of dividing a wavelength band of each of RGB colors into two is incorporated, and the projector 60 projects an image for the right eye and an image for the left eye consisting of different RGB wavelength bands on a screen 100a as a display surface.

Figure 12B:
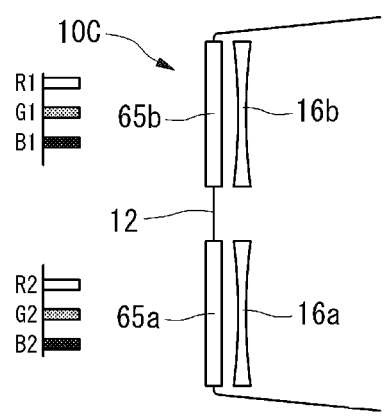
FIG. 12(b) is a view illustrating stereoscopic eyeglasses according to still another embodiment of the present invention.

To stereoscopic eyeglasses 10C adapted to this display, as illustrated in FIG. 12(b), a spectral filter 65a for the left eye and a spectral filter 65b for the right eye are attached as optical filters. The spectral filter 65a for the left eye is configured to transmit only light having a wavelength band corresponding to the image for the left eye, and the spectral filter 65b for the right eye is configured to transmit only light having a wavelength band corresponding to the image for the right eye. Accordingly, the stereoscopic eyeglasses are configured so that the image for the left eye is viewed with the left eye of an observer, and the image for the right eye is viewed with the right eye of the observer.

In the stereoscopic eyeglasses 10C, a wide-focus lens 16a for the left eye and a wide-focus lens 16b for the right eye are disposed corresponding to the spectral filter 65a for the left eye and the spectral filter 65b for the right eye. The stereoscopic eyeglasses 10C can also be configured by combining the spectral filters 65a and 65b and the wide-focus lenses 16a and 16b as appropriate as in the case of the stereoscopic eyeglasses 10A illustrated in FIGS. 9.

Next, an eyeglass lens 24 as a wide-focus lens to be used for the stereoscopic eyeglasses 10A according to the first embodiment will be described. Of course, the eyeglass lens 24 can be used for the stereoscopic eyeglasses 10B and 10C of other embodiments.

In the following description, the anteroposterior, the left-right, and the vertical directions as viewed from a user wearing the stereoscopic eyeglasses 10A using the eyeglass lenses 24 are respectively defined as anteroposterior, left-right, and vertical directions in the lenses.

Figure 13A:
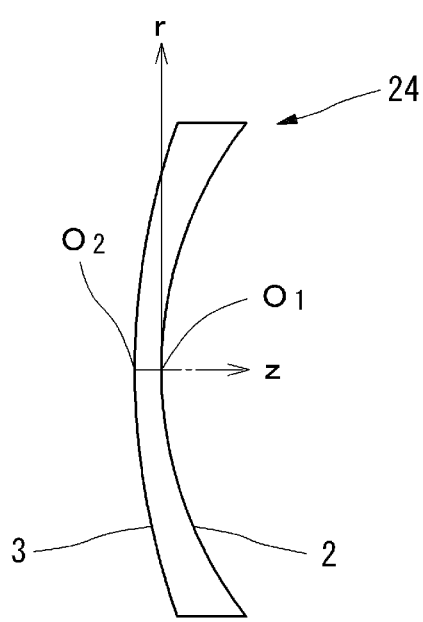
FIG. 13(a) is a schematic view of an entirety of an eyeglass lens to be used for the stereoscopic eyeglasses according to the embodiment of the present invention.
Figure 13B:
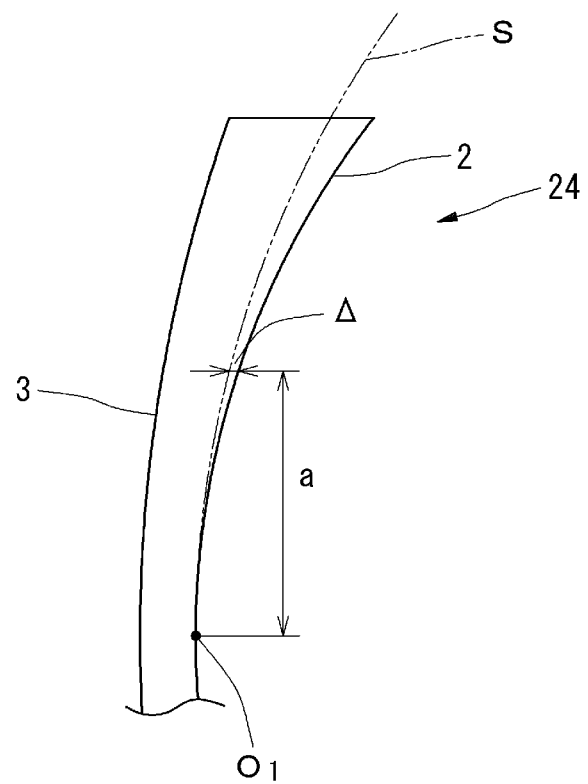
FIG. 13(b) is an enlarged schematic view of an upper half of the same lens.

In FIG. 13, the eyeglass lenses 24 have a rear surface 2 formed as a concave surface defined by the following Equation (i), and a front surface 3 formed as a convex surface defined by the following Equation (ii). An axis in the anteroposterior direction, passing through an optical center O (basic point $O_1$ on the rear surface 2, basic point $O_2$ on the front surface 3) of the lenses 24, is defined as the z-axis, and a positive direction of the z-axis is set in a direction toward the rear side of the lenses 24. The z-axis matches an optical axis of the lenses 24.

$$z = r^2/(R_1 + (R_1^2 - Kr^2)^{1/2}) + \delta_1 + \delta_2 \qquad \text{Equation (i)}$$

$$z = r^2/(R_2 + (R_2^2 - Kr^2)^{1/2}) \qquad \text{Equation (ii)}$$

r in Equation (i) and Equation (ii) is a distance from the z-axis. That is, considering an orthogonal coordinate system having an axis in the left-right direction and an axis in the vertical direction orthogonal to the z-axis, respectively set as an x-axis and a y-axis, and the basic point $O_1$ defined as a center on the rear surface 2 and the basic point $O_2$ defined as a center on the front surface 3, $r = (x^2 + y^2)^{1/2}$. $R_1$ and $R_2$ are curvature radiuses at apexes of the surfaces, K (conic constant) is 1.

In Equation (i) defining the rear surface 2, $\delta_1$ is an average power stabilization component expressed as $Ar^4 + Br^6 + Cr^8 + Dr^{10}$ (r is a distance from the z-axis, and A, B, C, and D are constants). $\delta_2$ is a depth-of-field extension component expressed as $Er^3$ (r is a distance from the z-axis, and E is a positive constant). Therefore, the lenses 24 in this example have a front surface 3 being a spherical surface and a rear surface 2 being an aspherical surface. $R_1$ and $R_2$ are determined according to the prescription power (0 D in this example).

Figure 14:
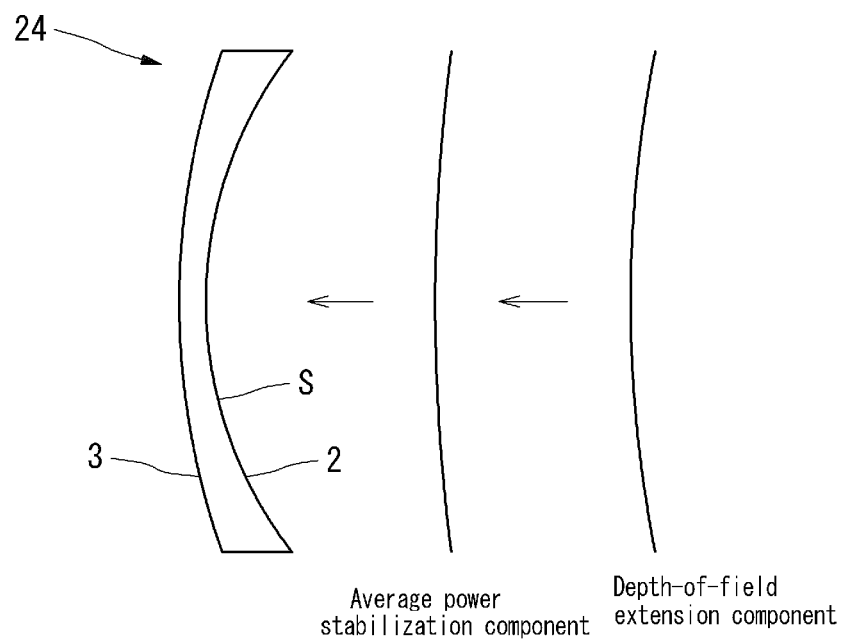
FIG. 14 is a view for describing the eyeglass lens illustrated in FIGS. 13.

In this way, the lenses 24 in this example are obtained by adding the average power stabilization component $\delta_1$ and depth-of-field extension component $\delta_2$ to the refractive surface (spherical surface with a curvature radius $R_1$ in this example, hereinafter, also referred to as an original spherical surface, shown by a reference sign S) of the lens rear surface 2 determined according to the prescription power (refer to FIG. 14).

The depth-of-field extension component $\delta_2$ expressed as $Er^3$ has an effect of substantially linearly changing average power a to the negative side along a lens radial direction from the optical center to a lens peripheral edge as shown in FIG. 15. Therefore, with the eyeglass lenses 24, a range of focusing is expanded, and the focal length can be provided with a range.

The constant E can be set as appropriate according to a purpose and use. For example, in order to obtain a certain level of effect against visual fatigue in stereoscopic display and realize a comfortable life even when always wearing the eyeglasses, it is desirable to select the constant E from a range of $6.40 \times 10^{-7}$ to $6.40 \times 10^{-5}$. As the value of the constant E is set to be larger, a focusable range is expanded, and a range enabling comfortable stereovision can be further expanded. For example, when the constant E is set to $1.66 \times 10^{-3}$, in a case where a pupil diameter is 5 mm, a change in average power in stereovision becomes approximately 0.5 D, and the range enabling comfortable stereovision can be expanded to, for example, the extent illustrated in Paragraphs 0035 to 0040 (example using stereoscopic eyeglasses for observation of a stereoscopic television or stereoscopic monitor).

As shown in (b) in FIG. 13, when Δ is a height in the z-axis direction at a radius a based on the original spherical surface S (that is, an increase in thickness from the original spherical surface S), in a case where the constant $E=7.68\times 10^{-6}$, a is 25 mm, and Δ is 120 μm. $E=\Delta/1000/a^3$ is satisfied (unit of a: mm, unit of Δ: μm).

However, if the power distribution in a lens surface before the depth-of-field extension component $\delta_2$ is added is not constant, the effect of depth-of-field extension by the aspherical component expressed as $Er^3$ is not stably produced. Therefore, in this example, for the purpose of temporarily making the average power substantially constant from the lens center toward a peripheral edge portion, the average power stabilization component $\delta_1$ expressed as $Ar^4+Br^6+Cr^8+Dr^{10}$ (r is a distance from the z-axis, and A, B, C, and D are constants) is added to the lens rear surface 2.

Next, a method for designing the eyeglass lens 24 will be described.

First, based on prescription power, a refractive surface of the front surface 3 and a refractive surface of the rear surface 2 of the lens 24 are determined. A method of this determination is well known, and is not described in detail here. Next, aspherical components are added to the refractive surface (original spherical surface S) of the rear surface 2 of the lens determined according to the prescription power. Specifically, an aspherical component is added to the refractive surface of the rear surface 2 through a first aspherical component adding step of adding an average power stabilization component $\delta_1$ that suppresses variations in average power, and a second aspherical component adding step of adding a depth-of-field extension component $\delta_2$ that extends a depth of field.

In the first aspherical component adding process, average power stabilization component $\delta_1$ expressed as $Ar^4+Br^6+Cr^8+Dr^{10}$ (r is a distance from the z-axis, and A, B, C, and D are constants) is obtained and added to the refractive surface of the rear surface 2. In the lens to which average power stabilization component $\delta_1$ is added, as shown by the dashed line β in FIG. 15, the average power can be made substantially constant along a radial direction of the lens.

Regarding the average power stabilization component $\delta_1$, a refractive surface shape of the rear surface 2 expressed by using the following Equation (iii) for an aspherical surface is simulated by ray tracing, and aspherical coefficients A, B, C, and D optimum for suppressing changes in power (specifically, average power as an average of refractive power in the meridional direction and refractive power in the sagittal direction) are obtained, and from values of these aspherical coefficients, the average power stabilization component $\delta_1$ can be obtained.

$$z=r^2/(R_1+(R_1^2-Kr^2)^{1/2})+Ar^4+Br^6 3Cr^8+Dr^{10} \quad \text{Equation (iii)}$$

Here, z is a sag value in the rear surface 2, r is a distance from the z-axis, $R_1$ is a curvature radius of apex, and A, B, C, and D are constants (aspherical coefficients).

Next, in the second aspherical component adding process, the depth-of-field extension component $\delta_2$ expressed as $Er^3$ (r is a distance from the z-axis, and E is a constant) is added to the refractive surface of the rear surface 2. In this example, for example, the constant E can be set to $E=7.68\times 10^{-6}$. This value of the constant E is preferable when a certain level of effect is obtained against visual fatigue in stereoscopic display, and the eyeglasses are always worn.

On the other hand, as the value of the constant E is set to be larger, the range enabling comfortable stereovision can be expanded.

In this way, the refractive surface shape of the rear surface 2 of the lens 24 defined by Equation (i) described above is determined.

EXAMPLES

Stereoscopic eyeglasses (Examples 1 and 2) of the embodiment formed by combining depth-of-field extension lenses with circular polarization films, were manufactured, and "viewability" and "eye fatigue" at the time of observation of stereoscopic display were evaluated.

Stereoscopic eyeglasses (GetD circular polarization 3D eyeglasses) available on the market, including circular polarization films, were used as a comparative example, and stereoscopic eyeglasses obtained by fitting the following eyeglass lenses to the stereoscopic eyeglasses available on the market were used as stereoscopic eyeglasses of Examples 1 and 2.

Data common to the eyeglass lenses used in the stereoscopic eyeglasses of Examples 1 and 2 are as follows.
Refractive index: 1.608
Front surface base curve: 4.12
Power: 0.00 D
Central thickness: 1.80 mm
Outer diameter: φ75 mm
Values of constants of aspherical components added to each lens are as shown in the following Table 1.

TABLE 1

|  | Example 1 | Example 2 |
|---|---|---|
| Constant A | −1.09E−08 | −1.09E−08 |
| Constant B | 3.70E−12 | 3.70E−12 |
| Constant C | −2.60E−15 | −2.60E−15 |
| Constant D | 6.66E−19 | 6.66E−19 |
| Constant E | 7.68E−06 | 1.22E−05 |
| Δ: Height (μm) at effective radius | 120 | 190 |
| a: Effective radius (mm) | 25 | 25 |

Subjects are four in number (age 30 to 55), and two of the four are spectacle wearers. The subjects viewed stereoscopic video content (3D movie) available on the market while wearing the stereoscopic eyeglasses of the comparative example and Examples described above. As display devices, a 23-inch wide liquid crystal display manufactured by Mitsubishi Electric Corporation and a BD/DVD player BDP-S6700 manufactured by SONY were used, and a distance between the display surface and the eyes of the subject was set to 90 to 120 cm.

After viewing for a predetermined period of time, "viewability" and "eye fatigue" with the stereoscopic eyeglasses of Examples were evaluated according to 5 categories, bad, somewhat bad, unchanged, slightly better, and good, compared to the stereoscopic eyeglasses of the comparative example.

Figure 17A:
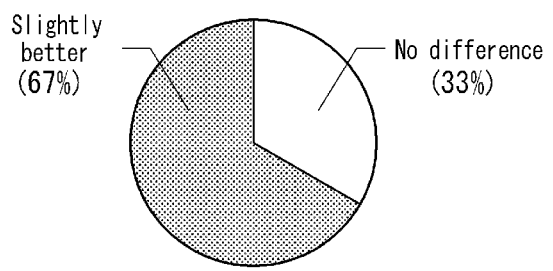
FIG. 17 are diagrams illustrating evaluation results, following FIGS. 16.
Figure 17B:
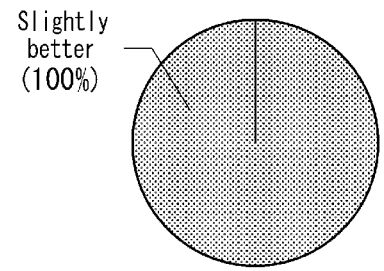
Figure 18:
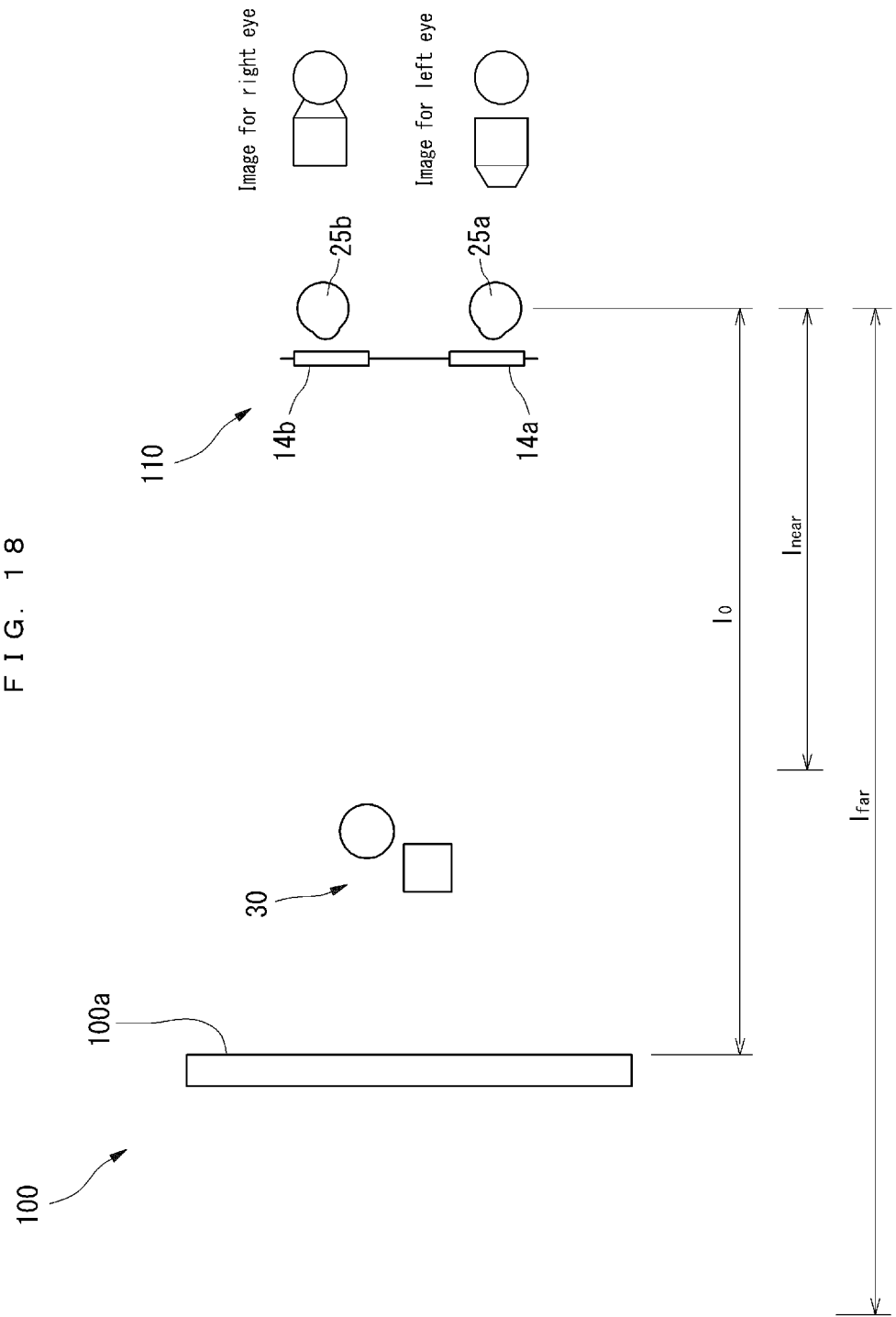
FIG. 18 is an explanatory view illustrating the principle of binocular stereoscopic display.

FIGS. 16 and 17 illustrate evaluation results of the stereoscopic eyeglasses of Example 2. FIG. 16 shows results (number of responses: 4) obtained after 30 minutes from the start of viewing of the movie. FIG. 17 shows results (number of responses: 3) obtained after 120 minutes from the viewing start.

According to these FIG. 16 and FIG. 17, a half or more of the results of evaluation on the stereoscopic eyeglasses of Example 2 were "slightly better" in both of "viewability" and "eye fatigue." In particular, when the viewing time was long, the ratio of "slightly better" became high. Broadly similar results were also obtained with the stereoscopic eyeglasses of Example 1. These are considered to have been obtained by an effect of enlarging a stereoscopic image display range enabling comfortable stereovision by using the eyeglass lenses having a depth-of-field extension effect.

Other Modifications and Application Examples (1) The above-described embodiment is an example in which the constant E of the depth-of-field extension component $Er^3$ added to the rear surface 2 of the lens is a positive number, however, the constant E may be a negative number. In this case, a depth-of-field extension component to gradually change the average power to the positive side from the lens optical center toward the lens peripheral edge is added. Here, in order to obtain a certain level of effect against visual fatigue in stereoscopic display and realize a comfortable life even when always wearing the eyeglasses, it is desirable to select the constant E from a range of $-6.40 \times 10^{-7}$ to $-6.40 \times 10^{-5}$. As the value of the constant E is made smaller (the absolute value is made larger), a focusable range is expanded, and the range enabling comfortable stereovision can be further expanded. For example, when the constant E is set to $-1.66 \times 10^{-5}$, in a case where the pupil diameter is 5 mm, a change in average power in stereovision becomes approximately 0.5 D, and the range enabling comfortable stereovision can be expanded to, for example, the extent illustrated in Paragraphs 0035 to 0040 (example using stereoscopic eyeglasses for observation of a stereoscopic television or stereoscopic monitor).

(2) The embodiment described above is an example in which the average power stabilization component $\delta_1$ is added to the rear surface 2 of the lens, however, the average power stabilization component $\delta_1$ may be added to the front surface 3 of the lens, or can be added to both of the front surface 3 and the rear surface 2. For example, it is also possible that an average power stabilization component $\delta_1$ expressed as $Ar^4+Br^6$ (in this case, values of the constants C and D are zero) is added to the front surface 3, and further, an average power stabilization component $\delta_1$ expressed as $Cr^8+Dr^{10}$ (in this case, values of the constants A and B are zero) is added to the rear surface 2.

(3) The embodiment described above is an example in which the depth-of-field extension component $\delta_2$ is added to the rear surface 2 of the lens, however, it is also possible that the depth-of-field extension component $\delta_2$ is added to the front surface 3 of the lens.

(4) The embodiments described above illustrate a plano lens that is substantially plano as an eyeglass lens to be used for stereoscopic eyeglasses, however, an eyeglass lens in which a power component for correcting at least any of myopia, hyperopia, and astigmatism is further set can also be used.

REFERENCE SIGNS LIST

2: rear surface, 3: front surface, 10, 10A, 10B, 10C: stereoscopic eyeglasses, 14*a*: optical filter for left eye, 14*b*: optical filter for right eye, 16, 16*a*, 16*b*: wide-focus lens, 24: eyeglass lens, 25*a*: left eye, 25*b*: right eye, 42*a*, 42*b*: polarizer (polarization film), 50*a*, 50*b*: liquid crystal shutter, 65*a*, 65*b*: spectral filter, 100*a*: display surface, $f_1$, $f_2$: focal length, $\delta_1$: average power stabilization component, $\delta_2$: depth-of-field extension component

The invention claimed is:

1. A method for observing a stereoscopic image, comprising using stereoscopic eyeglasses, the stereoscopic eyeglasses comprising:
   an optical filter for a left eye which transmits only an image for the left eye out of the image for the left eye and an image for a right eye displayed on a display surface of an image display device;
   the optical filter for the right eye which transmits only the image for the right eye out of the image for the left eye and the image for the right eye;
   a wide-focus lens for the left eye ranging in focal length disposed so as to overlap the optical filter for the left eye in a light transmission direction; and
   a wide-focus lens for the right eye ranging in focal length disposed so as to overlap the optical filter for the right eye in the light transmission direction,
   wherein when an observation distance to the display surface is 2m or more, by using the wide-focus lenses having a negative focal length, a stereoscopic display range enabling comfortable observation of the stereoscopic image is expanded at a front of the display surface of the image display device on which the image for the left eye and the image for the right eye are displayed,
   wherein when the observation distance to the display surface is 0.6 m or less, by using the wide-focus lenses having a positive focal length, the stereoscopic display range enabling comfortable observation of the stereoscopic image is expanded at a rear of the display surface of the image display device on which the image for the left eye and the image for the right eye are displayed,
   wherein when the observation distance to the display surface is more than 0.6m to less than 2m, by using the wide-focus lenses having positive and negative focal lengths, the stereoscopic display range enabling comfortable observation of the stereoscopic image is expanded at both of the front and the rear of the display surface of the image display device on which the image for the left eye and the image for the right eye are displayed.

2. Stereoscopic eyeglasses, wherein wide-focus lenses ranging in focal length are incorporated to expand a tolerance of match between vergence and accommodation enabling comfortable stereovision in eyeglasses using stereovision, the stereoscopic eyeglasses comprising:
   a pair of left and right eyeglass lenses as the wide-focus lenses, wherein
   in each of the eyeglass lenses, when an axis in the anteroposterior direction passing through a lens optical center is defined as a z-axis, and a direction toward the rear side of the lens is defined as a positive direction of the z-axis, an average power stabilization component which is expressed as $Ar^4+Br^6+Cr^8+Dr^{10}$ (r is a distance from the z-axis, and A, B, C, and D are constants) and suppresses variations in average power from the lens optical center to a lens peripheral edge portion is added to a z-coordinate value of at least one of the front surface and the rear surface of the lens, and
   a depth-of-field extension component expressed as $Er^3$ (E is a constant) is added to a z-coordinate value of either the front surface or the rear surface of the lens.

3. The stereoscopic eyeglasses according to claim 2, wherein the eyeglass lenses gradually change in average power to the negative side or the positive side from the lens optical center toward the lens peripheral edge portion.

4. The stereoscopic eyeglasses according to claim 2, wherein in the eyeglass lenses, a power component for correcting at least myopia, hyperopia, and astigmatism is further set.

5. A method for designing the eyeglass lens to be used for the stereoscopic eyeglasses according to claim 2, comprising:
- a first aspherical component adding step of adding an average power stabilization component which is expressed as, when an axis in the anteroposterior direction passing through a lens optical center is defined as a z-axis, and a direction toward the rear side of the lens is defined as a positive direction of the z-axis, $Ar^4+Br^6+Cr^8+Dr^{10}$ (r is a distance from the z-axis, and A, B, C, and D are constants) and suppresses variations in average power from the lens optical center to a lens peripheral edge portion, to a z-coordinate value of at least one of the front surface and the rear surface of the lens determined according to the prescription power; and
- a second aspherical component adding step of adding a depth-of-field extension component which is expressed as $Er^3$ (E is a constant) and extends a depth of field, to a z-coordinate value of either the front surface or the rear surface of the lens.

6. The stereoscopic eyeglasses according to claim 2, comprising:
- an optical filter for a left eye which transmits only an image for the left eye out of the image for the left eye and an image for a right eye displayed on a display surface of an image display device;
- the optical filter for the right eye which transmits only the image for the right eye out of the image for the left eye and the image for the right eye;
- the wide-focus lens for the left eye disposed so as to overlap the optical filter for the left eye in a light transmission direction; and
- the wide-focus lens for the right eye disposed so as to overlap the optical filter for the right eye in the light transmission direction.

7. The stereoscopic eyeglasses according to claim 6, wherein the optical filters are formed of polarizers.

8. The stereoscopic eyeglasses according to claim 6, wherein the optical filters are formed of liquid crystal shutters.

9. The stereoscopic eyeglasses according to claim 6, wherein the optical filters are formed of spectral filters.

* * * * *